P. P. FLOURNOY.
PRUNING-IMPLEMENT.
No. 177,489.    Patented May 16, 1876.
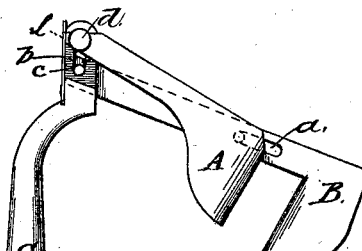
Fig. 1.
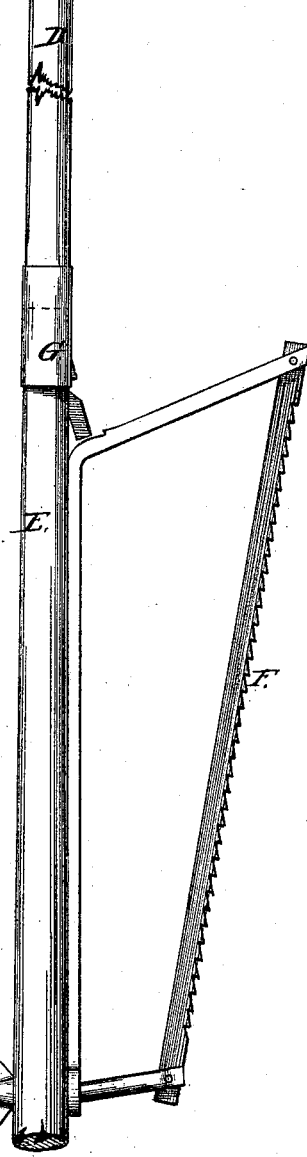
Fig. 2.
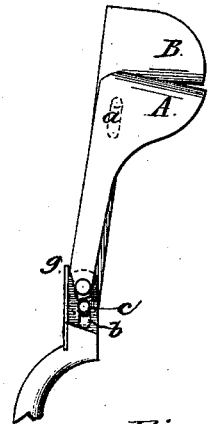
Fig. 3.
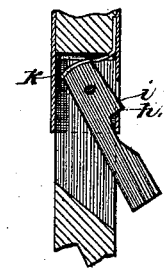
Attest:
M. Gardner
A. A. Yeatman
Inventor:
Parker P. Flournoy

UNITED STATES PATENT OFFICE.

PARKE P. FLOURNOY, OF BETHESDA, MARYLAND.

IMPROVEMENT IN PRUNING IMPLEMENTS.

Specification forming part of Letters Patent No. 177,489, dated May 16, 1876; application filed May 3, 1876.

*To all whom it may concern:*

Be it known that I, PARKE P. FLOURNOY, of Bethesda, in the county of Montgomery and State of Maryland, have invented a new and useful Pruning Instrument, a description of which is set forth in the following specification, reference being had to the accompanying drawings.

Figure 1 shows the instrument, consisting of two knives—a chisel-knife, A, and a hook-knife, B—attached to a handle, C, a staff, D, and an extension-staff, E, which is furnished with a saw, F, and coupled with the staff by the coupling G. The hook-knife B has a slot, *a*, in its shaft, in which a rivet, which is fixed in the chisel-knife A, slides when the knives are opened or closed. The hook-knife is attached to the handle C by a screw and tap, for convenience in sharpening. When the knives are drawn together in the operation of cutting by pressure in the direction of the staff D, the screw or bolt which attaches the hook-knife B to the handle C slides along the curved slot *b* toward the axis upon which the chisel-knife A revolves, so that the lever-power by which the blades are forced together is continually increased as the operation proceeds. The chisel-knife A is attached to the handle C by a rivet, which is stationary at *d*. The end of the shaft of the chisel-knife A works against a spring on the back of the handle (see Fig. 2, *g*) in such a way that when the operation of cutting is completed, the knife is thrown back to its position before the operation began, and the spring then presses upon the surface *l*, (see Fig. 1, *l*,) so as to hold the knives open. The handle C is round, and suited to being held in the hand when detached from the staff D, and, thus detached, may be used for pruning grape and other vines or small trees. The handle C is attached to a straight wooden staff, D, by a bolt and tap, which may be turned without a wrench, and, thus attached, may be used for all ordinary pruning. For reaching high branches, an extension-staff, E, is added. These two staves are united by the spring-coupler G. This coupler consists of a hollow cylinder, fixed upon the staff D, and held by a rivet passing through both, and a catch in the extension-staff E, which revolves upon the rivet. (See Fig. 3, *h*.) The hollow cylinder is furnished with a spring (Fig. 3, *k*,) within, and has in its side a slot. (Fig. 3, *i*.) When the end of the extension-staff E is pushed into the cylinder G, the catch *h* presses against the spring *k*, and is thrown into the slot *i* in the side of the cylinder G, and is caught and held fast by the continued pressure of the spring *k*. The extension-staff E is furnished with a bracket-saw, F, adjusted in an iron frame and stretched by the thumb-screw *f*. For whatever purpose the instrument is used, whether detached from the staff for pruning vines or attached to it for ordinary pruning, the knives are forced together by pressure in the direction of the handle and staff, which causes them to revolve around their axis of revolution at the points where they join the handle with a force which continually increases as these axes of revolution are brought nearer together by means of the curved slot in the handle. (Fig. 1, *b*). The saw is to be used for branches over two inches in diameter, and for the purpose of using it the extension-staff E, to which it is attached, should be separated from the staff D.

I claim as my invention—

1. The combination of the chisel-knife A and hook-knife B, united by a rivet, which is stationary in the chisel-knife, and slides in a slot in the hook-knife, with the handle C, the chisel-knife by a stationary rivet and the hook-knife by a bolt, sliding in the curved slot *b*, both being opened and held open by a spring, substantially as described, and for the purposes set forth.

2. The single rod, divided into two sections, which are coupled by a slotted sleeve, fixed upon the staff D, and furnished with a spring within, and a catch, revolving on a rivet fixed in the extension-staff E, said catch, when it comes in contact with the spring, being thrown up into the slot in the sleeve, and held by the continued pressure of the spring.

3. The saw, mounted in an iron frame, which is attached to the extension-staff E, and stretched by a screw, by which it is drawn in the direction of a tangent to its circle of revolution around the point at which it is attached to the iron frame, this screw forming the support for the lower end of the saw.

PARKE P. FLOURNOY.

Witnesses:
WM. J. COOKE,
N. R. BAKER.